Dec. 19, 1967  J. L. KRECHEL  3,358,705
VALVE ASSEMBLY
Filed Sept. 9, 1964
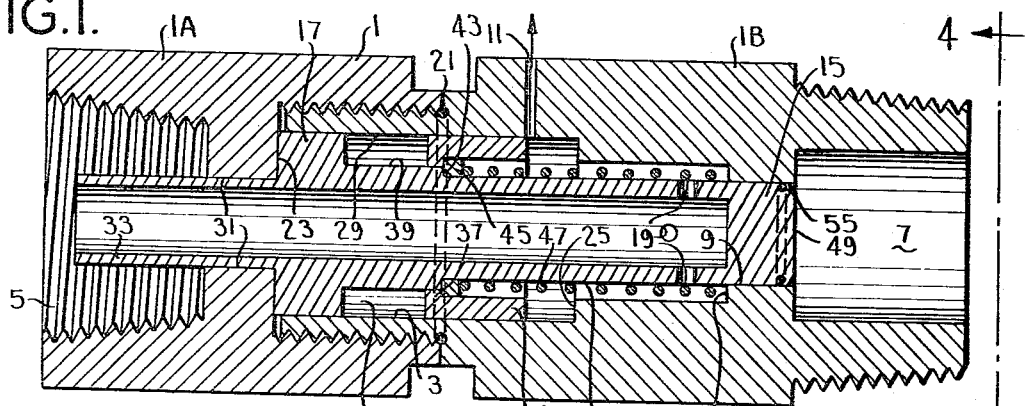
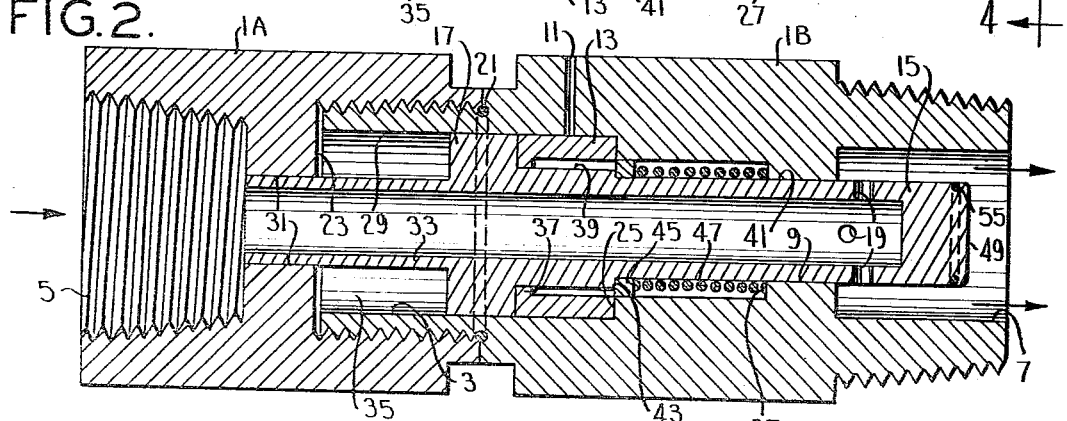
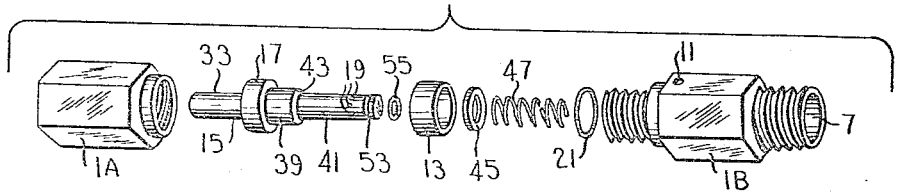
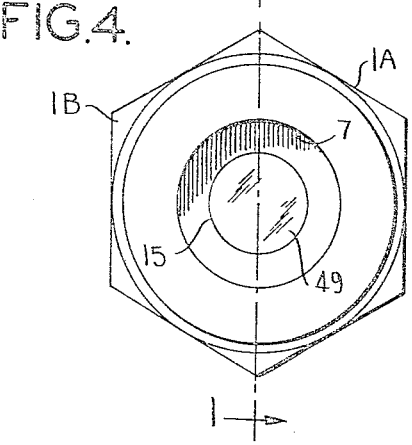
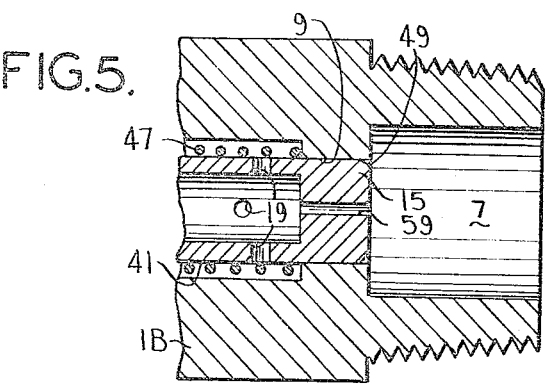
Joseph L. Krechel,
Inventor,
Koenig, Senniger, Powers and Leavitt
Attorneys

United States Patent Office 3,358,705
Patented Dec. 19, 1967

3,358,705
VALVE ASSEMBLY
Joseph L. Krechel, Lake Montowese, Rte. 2,
House Springs, Mo. 63051
Filed Sept. 9, 1964, Ser. No. 395,229
13 Claims. (Cl. 137—116)

Compressors, pumps, etc. for fluids may have their outlet ports connected directly to a fluid load when they are started. Therefore, the compressor or pump is designed for overcoming the external starting load in addition to its internal starting load. The starting load may be reduced by providing an unloader valve for reducing the load at the compressor outlet, and where such a valve is provided a check valve downstream of the unloader valve may also be provided for preventing fluid flow through the unloader valve to the compressor or pump. A check valve located in a fluid system immediately downstream of a compressor or pump is subject to "flutter" or high speed vibrations resulting from surges of pressure. This vibration causes excessive wear on the check valve and substantially reduces its life. When compressing gases (such as air) some moisture in the gas is condensed during compression and this moisture should be periodically drained to prevent fouling of associated equipment.

Accordingly among the several objects of this invention may be noted the provision of an improved unloader valve assembly for automatically reducing the pressure at the outlet manifold of a fluid pump or compressor after it has stopped and before restarting the pump or compressor; the provision of an improved combination unloader and check valve assembly wherein the unloading function occurs after engagement of the check valve with its seat; the provision of a combination unloader and check valve assembly wherein flutter caused by surges of pressure entering the valve is substantially reduced, thereby reducing friction and wear on the valve assembly; the provision of an improved unloader check valve wherein vibration caused by pressure surges entering the valve are dampened, and such a valve wherein the unloading function and seating of the check valve is delayed a short time increment after stopping of a pump or compressor supplying fluid to the valve; the provision of an improved unloader check valve wherein the unloading and check valve functions are coordinated for preventing unloading while the check valve is opened or for opening the check valve while the unloading mechanism is opened; the provision of an improved unloader check valve by means of which moisture condensed during compression of gas is discharged through the valve; the provision of an improved unloader valve usable with or without a check valve; the provision of an unloader valve with a low pressure drop through the valve; and the provision of an improved unloading check valve assembly which is reliable, easy to assemble and can be produced economically. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a longitudinal cross section taken on line 1—1 of FIG. 4 of an unloader check valve assembly of this invention showing the check valve closed and the unloader open;

FIG. 2 is a view similar to FIG. 1 showing the unloader closed and the check valve open;

FIG. 3 is an exploded view on a smaller scale of the valve of FIGS. 1 and 2;

FIG. 4 is an end view taken from the right end of FIG. 1 on line 4—4; and

FIG. 5 is a fragmentary view of a modification.

Corresponding reference characters indicate corresponding parts throughout the several views of the drawings.

Referring to the drawings, a valve assembly of the invention is shown to comprise a valve body 1 having a bore 3 with an inlet end 5 and an outlet end 7. In body 1 near outlet end 7 of the bore 3 there is a check valve seat 9. The valve body 1 has a bleeder port 11 which extends through the body from bore 3 to the outer body surface. A valve sleeve 13 reciprocates in bore 3 for opening and closing the communication of port 11 with the bore. A hollow valve check 15 slides in bore 3 and is engageable with seat 9 (its FIG. 1 position) for closing the bore 3 to the passage of fluids. Valve 15 moves from its FIG. 1 to its FIG. 2 position for opening the valve assembly to the passage of fluids. The valve 15 slides within sleeve 13 and an integral collar 17 on valve 15 has a lost-motion connection with sleeve 13 for moving the sleeve and closing bleeder port 11 as valve 15 is moved to open bore 3. Valve 15 is open at its left end and has ports 19 through its wall near its right end. When the valve is in its FIG. 2 position there is a passage for fluid from inlet 5 to outlet 7 of the valve assembly through the interior of valve 15 and ports 19.

More particularly, the valve body 1 is preferably made of two pieces 1A and 1B which are assembled by threading body piece 1B into body piece 1A, the outer surface of the body being hexagonal to facilitate this assembly operation. An O-ring 21 seals the connection between the body pieces. Inlet end 5 of bore 3 is in piece 1A and outlet end 7 of the bore is in piece 1B. Bore inlet 5 is threaded for connection to a conduit from the outlet manifold of a compressor, pump or the like (not shown) or it may be connected directly to the outlet manifold of the compressor, pump or other source of fluid. Body piece 1B is also preferably threaded as shown so that a conduit or coupling can be joined to the body and to the receiver equipment or reservoir to which the fluid under pressure is provided.

The body 1 has three shoulders, a shoulder 23 in body piece 1A facing body piece 1B, and shoulders 25 and 27 in body piece 1B facing shoulder 23. The shoulders 23, 25 and 27 are formed by radially inwardly projecting portions of the body which provide a stepped bore. Between shoulders 23 and 25 in body piece 1B there is a cylindrical surface 29. Bleeder port 11 opens to bore 3 through the surface 29. Sleeve 13 snugly engages the surface 29 and reciprocates along the right end of this surface (as viewed in the drawings), moving from its FIG. 1 position where bleeder port 11 is in communication with bore 3 to its FIG. 2 position abutting shoulder 25 where it covers bleeder port 11 and prevents communication between it and the bore 3. Collar or flange 17 on valve 15 also snugly engages surface 29. Travel of valve 15 is limited by collar 17 which moves between a position against shoulder 23 at the left end of the surface 29 (FIG. 1) and a position where it abuts sleeve 13 while the latter in turn abuts shoulder 25 (FIG. 2). Adjacent shoulder 23 in body 1 is a cylindrical surface 31 constituting a guide through which a closely fitting tubular end portion 33 of the valve 15 slides.

When collar 17 moves away from shoulder 23, there is defined between the collar 17, surface 29, shoulder 23 and tubular portion 33 of the valve a substantially closed and relatively air-tight expansible chamber designated 35. Some air or fluid can bleed into (or out of) chamber 35 between valve portion 33 and the guide 31 in the bore as well as around sleeve 13 and between collar 17 and surface 29. Assuming that the valve is at its right hand position (FIG. 2) and that it is beginning movement to the left for closing the valve assembly, the air or fluid trapped in chamber 35 will retard movement of the valve 15 and cause it to move relatively slowly toward the left until collar 17 engages shoulder 23 (its FIG. 1 position). As valve 15 moves to the right, a slight vacuum is created in chamber 35 until fluid leaks into the chamber and this negative pressure also retards movement of valve 15. Thus, chamber 35 forms a dampening chamber which reduces tendency of the valve 15 to rapidly vibrate within bore 3. Valve 15 has a tendency to vibrate when the valve assembly is used with reciprocating compressors or pumps, for example, which deliver fluid to inlet 5 in surges rather than in a smooth, continuous flow.

A radially inwardly projecting flange 37 on the left end of sleeve 13 rides on a generally cylindrical surface 39 on valve 15 adjacent collar 17. As will be seen from comparing FIGS. 1 and 2, surface 39 slides back and forth beneath flange 37. There is a sliding, lost-motion connection between the valve 15 and the sleeve 13 by means of which bleeder port 11 is closed after limited movement of valve 15 to the right. As a result of this lost-motion connection any vibration of valve 15 not dampened by chamber 35 will not be imparted to the sleeve 13. Thus there is no tendency to open bleeder port 11 with each surge of pressure from a compressor.

Adjacent surface 39 on valve 15 is a cylindrical surface 41 which is smaller in diameter than surface 39, and between surfaces 39 and 41 is a shoulder 43. Surrounding surface 41 and abutting shoulder 43 is a ring 45. A coil spring 47 positioned around surface 41 of valve 15 reacts from shoulder 27 against ring 45 biasing the ring and thus the valve 15 toward the left to its FIG. 1 position. Ring 45 is smaller in diameter than the right and center positions of sleeve 13 and is larger in diameter than flange 37 on sleeve 13. As valve 15 is moved from its FIG. 2 to its FIG. 1 position, the ring 45 first passes beneath the right and center portions of sleeve 13 and then engages the right side of flange 37 for moving the sleeve 13 to the left with the valve 15. This movement of sleeve 13 opens bleeder port 11 to bore 3. Due to the lost-motion connection between ring 45 and flange 37 of the sleeve 13, valve 15 is capable of limited sliding movement in bore 3 without imparting the movement directly to sleeve 13 through ring 45.

Valve 15 is hollow over substantially its entire length and is open at the left or inlet end. The right end of valve 15 is closed by a cap portion 49. Holes or ports 19 extend radially through the valve wall adjacent cap 49 and may be longitudinally staggered as shown. The holes or ports 19 together with the hollow of the valve and its open left end define a passageway through the valve assembly by means of which fluid entering inlet 5 of the valve assembly passes to outlet 7 when the check valve is in its open (FIG. 2) position.

There is a groove 53 (FIG. 3) in valve surface 41 at cap portion 49 in which an O-ring seal 55 is seated. The seal 55 projects slightly above surface 41 and engages valve seat 9 in the body 1 for sealing the connection between the valve and its seat.

The valve may be assembled by placing end 33 of valve 15 in body piece 1B, moving sleeve 13 over closed end 49 of the valve onto surface 39 and against collar 17, and then positioning the ring 45 and spring 47 around the surface 41 of the valve. The O-ring seal 55 is then placed in the groove 53 and O-ring seal 21 is placed around the threads on the left end of body piece 1B, body piece 1B being screwed into body piece 1A to hold the parts in their assembled relation. The valve assembly may then be connected between a source of fluid under pressure and its reservoir or associated equipment to which the fluid is to be transferred. For example, the inlet end 5 of the valve assembly may be connected directly into the outlet manifold of an air compressor or to a line from the compressor, and outlet end of the valve may be connected (directly or indirectly) to a receiver reservoir for the compressor air.

Operation of the valve assembly is as follows:

Assuming the valve assembly is connected between an air compressor and its associated receiver, and that the compressor is unloaded, the valve parts will be in their FIG. 1 position, that is, valve 15 is to the left with the O-ring seal 55 engaging check valve seat 9 so that fluid from the receiver cannot enter outlet end 7 and pass through the valve assembly to the inlet end 5. Sleeve 13 is at its left position and bleeder port 11 provides communication between bore 3 and the atmosphere so that the valve assembly is at atmospheric pressure. There is a passageway from bleeder port 11 through the holes or ports 19 in valve 15, the hollow of the valve and through inlet 5 of the body to the compressor outlet so that the compressor outlet is also at atmospheric pressure.

When the compressor starts, air enters the valve assembly through inlet end 5 and passes through the hollow valve member 15, out ports 19 and initially passes through bleeder port 11 to the atmosphere. As the speed of the compressor increases, the volume of air delivered to the valve assembly also increases, and when this volume of air exceeds the capacity of bleeder port 11 to discharge the compressed air, the valve member 15 is moved to the right by the pressure differential upstream and downstream of cap portion 49. This movement is retarded by spring 47 which is compressed as valve member 15 moves to the right, and also by chamber 35 which is being expanded by collar 17 moving away from shoulder 23, thereby creating a slight vacuum in chamber 35 which retards movement of valve 15 to its FIG. 2 position. Movement of valve 15 to the right opens the check valve portion of the assembly by placing ports 19 in communication with the outlet 7 of the valve body. Then the compressed air can freely pass through the passage defined by the hollow of the valve 15, ports 19 and body 1 and into the line leading to the receiver.

As the valve member 15 travels to the right for opening the check valve, valve surface 39 slides freely beneath the flange 37 on the sleeve 13 until the collar 17 engages the left side of the sleeve. Further movement of the valve 15 to the right moves the sleeve 13 for closing the communication between bore 3 and port 11, thereby closing the unloader valve portion of the assembly. Since port 11 is relatively small, there is little loss to the atmosphere before the port is closed by sleeve 13. With the unloader valve closed and the check valve open, compressed air can be delivered through the valve assembly to its receiver. The valve assembly parts remain in their FIG. 2 position as long as the compressor delivers enough air to overcome the force of spring 47.

If the assembly is used with a reciprocating compressor, the valve assembly is constantly subjected to surges of pressure from the compressor. If these surges of pressure were not dampened they would cause considerable vibration and wear on the parts of the valve assembly, thereby reducing efficiency and shortening the lift of the valve. With the valve of this invention vibrations are dampened by chamber 35 which fills with fluid and effectively opposes any rapid movement of the valve member 15. Sleeve 13 is substantially isolated from limited vibrations or reciprocations of valve 15 due to the sliding connection between valve 15 and the sleeve 13.

When the compressor stops the fluid pressures downstream of outlet end 7 and upstream of the inlet end 5 quickly equalize and valve 15 is biased toward the left or to its closed position by the spring 47 reacting from shoulder 27 against the ring 45. Movement of valve 15 toward the left is retarded or delayed due to the presence of fluid in the chamber 35. This fluid slowly leaks around the valve 15 and permits a gradual return of valve member 15 to its FIG. 1 position for closing of the check valve portion of the assembly. During initial movement of the valve 15 to the left, valve surface 39 slides beneath sleeve flange 37 and the sleeve 13 remains substantially stationary. As ring 45 moves to the left it passes beneath the left and center portion of the sleeve and finally engages flange 37 to move the sleeve 13 to the left with valve member 15. When the sleeve 13 reaches its FIG. 1 position, air under pressure remaining in the fluid passage through the valve assembly and between the valve assembly inlet 5 and the compressor manifold is bled through ports 19 and bleeder port 11 to the atmosphere, thereby unloading the compressor. The compressed air downstream of the valve assembly is blocked from passage through the assembly by seal 55 engaging valve seat 9.

When the valve assembly receives compressed air or other gases, there may be some condensation at the outlet of the compressor and in the valve assembly. It is desirable to remove this condensate so that it is not transmitted to a reservoir or equipment receiving the compressed gas. With the unloader check valve assembly of the invention this moisture is discharged through the bleeder port 11 when the compressor is started. Discharge of moisture is achieved due to the relatively large volume of gas which escapes through port 11 resulting from the slight delay in opening of the check valve and closing of the bleeder port. This delay occurs due to the lost-motion connection between the sleeve and the valve 15 and also due to the presence of chamber 35. As valve 15 moves to the right the chamber 35 expands and, as explained before, a slight vacuum will be formed in the chamber retarding rapid movement of the valve, thereby permitting discharge of a large volume of air through bleeder port 11 which carries with it the moisture present. Movement of the valve to the right is also retarded by spring 47 which must be compressed when the valve is moved to the right.

Fluid flows substantially straight through the valve assembly of the invention. This results in a pressure drop across the valve assembly which is smaller than comparable globe type valves.

FIG. 5 shows a modified form of the valve assembly used for unloading both upstream and downstream of the assembly. In the FIG. 5 embodiment, there is a hole 59 through the end of cap portion 49 of valve 15 for passage of fluid to and from the upstream end of the valve. When valve 15 is retracted as shown in FIGS. 1 and 5, fluid from outlet 7 can enter hole 59 and pass through ports 19 for discharge through bleeder port 11. In other respects the FIG. 5 valve is similar to the FIGS. 1–4 valve. The compressor outlet manifold is unloaded in the manner previously explained.

During initial operation of a compressor, air (or other fluid) entering the hollow of valve 15 of the FIG. 5 assembly is discharged through bleeder port 11 as previously described and a portion of the air passes through hole 59. Since hole 59 and bleeder port 11 are relatively small, there will soon be a pressure differential across valve cap portion 49 which causes valve 15 to move to the right until ports 19 are in communication with outlet 7 as shown in FIG. 2. As this occurs, sleeve 13 is moved for closing bleeder port 11 in the manner described. When the compressor stops, spring 47 forces the valve 15 to its FIG. 5 position and opens bleeder port 11, thereby permitting unloading both upstream and downstream of the valve assembly.

While the invention has primarily been described for use with a compressed air system, it will be understood that the valve assembly is suitable for use in other liquid or gaseous systems. The valve assembly may be incorporated in a compressor structure or may be a separate article of manufacture.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An unloader valve assembly for compressors or the like comprising a valve body having a bore with an inlet end and an outlet end, a valve seat in the valve body, a bleeder port through the body from the bore to the outer body surface, a sleeve reciprocable in the bore for opening and closing the port, a valve having a portion engageable with the valve seat for closing the bore, the valve being slidable within the bore and the sleeve for opening and closing the bore, the valve when moving from the bore closing to the bore opening position initially having a sliding lost-motion connection with the sleeve and then the valves engaging the sleeve for moving the sleeve and closing the bleeder port, means carried by the valve and having a sliding lost-motion connection with the sleeve for moving the sleeve and opening the bleeder port as the valve moves to its bore closing position, and means defining a passage between the inlet end of the bore and the port when the valve is in its bore closing position.

2. An unloader valve assembly for compressors or the like comprising a valve body having a bore with an inlet end and an outlet end, a valve seat in the valve body, a bleeder port through the body from the bore to the outer body surface, a sleeve reciprocable in the bore for opening and closing the port, means for moving the sleeve for opening the bleeder port, and a valve having a portion engageable with the valve seat for closing the bore, the valve being slidable within the bore and the sleeve for opening and closing the bore, the valve having a sliding lost-motion connection with the sleeve for moving the sleeve and closing the bleeder port as the valve is moved to open the bore, said means for moving the sleeve for opening the bleeder port comprising a spring in the body reacting from the valve body and biasing the sleeve away from the bleeder port.

3. An unloader valve assembly for compressors or the like comprising a valve body having a bore with an inlet end and an outlet end, a valve seat in the valve body, a bleeder port through the body from the bore to the outer body surface, a sleeve reciprocable in the bore for opening and closing the port, means for moving the sleeve for opening the bleeder port, and a valve having a portion engageable with the valve seat for closing the bore, the valve being slidable within the bore and the sleeve for opening and closing the bore, the valve having a sliding lost-motion connection with the sleeve for moving the sleeve and closing the bleeder port as the valve is moved to open the bore, the means for moving the sleeve for opening the bleeder port comprising a coil spring reacting from the valve body against the sleeve and the valve biasing the sleeve away from the bleeder port and simultaneously biasing the valve to its closed position whereby the bleeder port is opened for unloading the compressor when the valve is closed.

4. An unloader valve assembly comprising a valve body having a bore with an inlet end and an outlet end, a bleeder port through the body from the bore to the outer body surface, a sleeve reciprocable in the bore and movable to a position to close the port, a hollow valve slidable in the bore from an open to a closed position, the valve being closed at its outlet end and having at least one valve port through its wall at the outlet end, said valve being movable in the bore in response to fluid pressure conditions at the inlet end and outlet end of the bore, the valve having a sliding lost-motion connection with the sleeve for moving the sleeve and closing the bleeder port, a coil spring reacting from the valve body against the sleeve biasing the sleeve away from the bleeder port for opening the bleeder port, a shoulder in the bore adjacent its outlet end against which the spring is seated, a second shoulder in the bore, and means on the valve engageable with the second shoulder when the valve is seated for limiting movement of the valve.

5. An unloader valve assembly as set forth in claim 4 further including a third shoulder in the bore adjacent said bleeder port engageable by said sleeve for limiting movement of the sleeve in the bore.

6. An unloader check valve assembly comprising an elongate two piece valve body having a bore with an inlet end in one of the body pieces and an outlet end in the other of the body pieces, each body piece having in its portion of the bore a shoulder, a bleeder port through the body from the outer body surface to the bore between the shoulders, an unloader valve sleeve reciprocable in the bore between the shoulders for opening and closing communication between the bore and the bleeder port, a valve seat in the other body piece adjacent the bore outlet end, a valve in the bore movable into and out of engagement with the seat for closing and opening the bore, said valve being movable in the bore to its open position in response to fluid pressure conditions at the inlet end and outlet end of the bore, the valve having a sliding lost-motion connection with the sleeve for moving the sleeve and closing the bleeder port as the valve is moved for opening the bore, and a collar on the valve between the shoulders in the bore, the collar, the valve and the body defining a dampening chamber for retarding reciprocating movement of the valve in the bore caused by surges of fluid pressure received at its inlet end.

7. An unloader check valve assembly as set forth in claim 6 wherein the valve seat is generally cylindrical in shape and the valve has a cylindrical portion with a seal attached thereto for engaging the seat and closing the bore.

8. An unloader check valve assembly as set forth in claim 6 wherein said valve has a passage therethrough providing communication between the body outlet end and the bleeder port when the bleeder port is open.

9. An unloader check valve assembly as set forth in claim 6 wherein the valve has a cylindrical surface with one end adjacent the collar and the sleeve has a radially inwardly projecting flange slidable on said surface for providing the sliding lost-motion connection therebetween.

10. An unloader check valve assembly as set forth in claim 9 further including a second cylindrical surface at the other end of the first cylindrical surface on the valve, a shoulder between the cylindrical valve surfaces, a ring abutting the shoulder on the valve, the ring being larger in outside diameter than the second cylindrical valve surface and the inner edge of the sleeve flange and smaller in inside diameter than the first cylindrical valve surface, and a coil spring around the second cylindrical valve surface reacting from the valve body against the ring, thereby biasing the valve to a position to close the bore and biasing the sleeve to a position to open the bleeder port.

11. An unloader valve assembly comprising a valve body having a bore with an inlet end and an outlet end, a bleeder port through the body from the bore to the outer body surface, a valve sleeve reciprocable in the bore for opening and closing the port, a valve member within the bore having a sliding lost-motion connection with the sleeve for moving the sleeve and closing the bleeder port, the valve member being movable in response to pressure differential between the inlet end and outlet end of the bore whereby the bleeder port is closed on pressure differentials, portions of the valve member and the valve body jointly defining a substantially closed annular expansible chamber, said chamber constituting means for dampening vibrational movement of the valve member relative to the valve body, and means for moving the sleeve for opening the bleeder port.

12. An unloader valve assembly as set forth in claim 11 wherein there is a fluid passage from both the inlet end and the outlet end of the bore through the valve member to the bleeder port.

13. An unloader valve assembly as set forth in claim 11 wherein the means for moving the sleeve for opening the bleeder port comprises a spring reacting from the valve body biasing the sleeve to its port-opening position.

References Cited
UNITED STATES PATENTS

| | | | |
|---|---|---|---|
| 1,902,231 | 3/1933 | Gurley | 137—108 |
| 2,649,111 | 8/1953 | Anderson | 137—627.5 |
| 2,669,248 | 2/1954 | Miller | 137—102 |
| 2,772,690 | 12/1956 | Mercier | 137—119 |
| 3,004,686 | 10/1961 | McKee | 137—505.25 |

WILLIAM F. O'DEA, *Primary Examiner.*

H. COHN, *Assistant Examiner.*